G. T. SOUTHGATE.
PROCESS FOR THE ELECTRIC FIXATION OF GASES.
APPLICATION FILED NOV. 22, 1920.
1,373,639.
Patented Apr. 5, 1921.
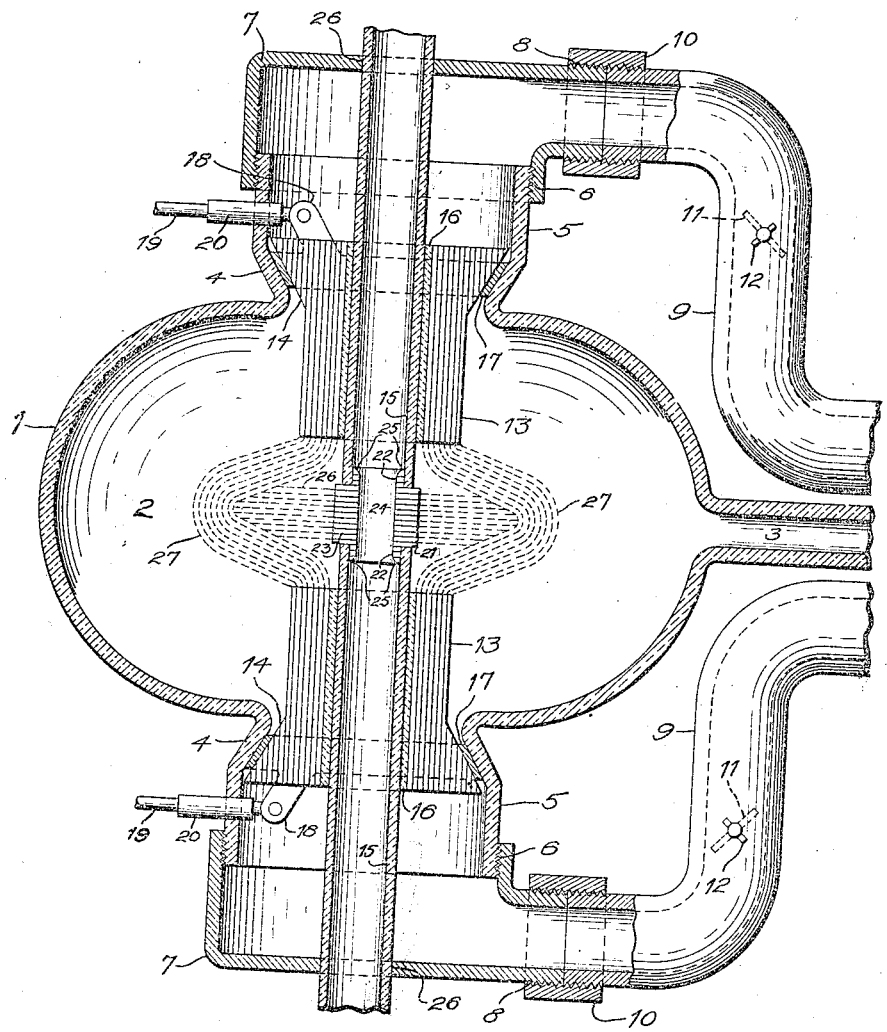
Inventor
George T. Southgate
By
John W. Kearney
Attorney

UNITED STATES PATENT OFFICE.

GEORGE T. SOUTHGATE, OF NEW YORK, N. Y.

PROCESS FOR THE ELECTRIC FIXATION OF GASES.

1,373,639.  Specification of Letters Patent.  Patented Apr. 5, 1921.

Original application filed April 11, 1918, Serial No. 227,975. Divided and this application filed November 22, 1920. Serial No. 425,600.

*To all whom it may concern:*

Be it known that I, GEORGE T. SOUTHGATE, a citizen of the United States, residing at New York, in the borough of Manhattan and State of New York, have invented certain new and useful Improvements in Processes for the Electric Fixation of Gases; and I do hereby declare the following to be a full, clear, and exact description of the invention, such as will enable others skilled in the art to which it appertains to make and use the same.

My invention relates to a process for the electric fixation of gases.

This application is a division from my application for U. S. Letters Patent for electric fixation of gases filed April 11, 1918, Serial No. 227975, and is intended to cover the process carried out by the apparatus therein shown.

In carrying out my invention I make use of an electric arc.

One object of my invention is to produce a very intimate contact with the arc of the whole of the gas or gases subjected to its influence.

Another object of my invention is to produce a very quick chilling of the gas or gases after they have been subjected to the influence of the arc, so that the compound formed may be quickly changed from its unstable high-temperature condition to a lower temperature before dissociation has taken place to an appreciable extent.

Another object of my invention is to provide means for controlling the pressure in the reaction chamber so as to secure the greatest output of the compound with the lowest energy consumption.

Another object of my invention is to provide a structure in which the electrodes may be readily changed and the spark gap made of any suitable length so as to be suitable for use with any voltage, or with a hissing or silent discharge.

Another object of my invention is to secure the highest activation of the gases through raising them to a high temperature, and also through electric ionization.

Another object of my invention is to provide means for the immediate scavenging of the gases after they have been acted upon in the reaction chamber.

Another object of my invention is to provide means for using the heat of the compound during its passage from the reaction chamber to pre-heat some of the gas before its admission to said chamber.

The means by which I attain the foregoing objects will be described with reference to the accompanying drawing.

In the electric fixation of gases, it is very desirable to cool the compound immediately after it has been subjected to the influence of the electric arc and heretofore this rapid cooling has been effected by mixing cool air with the compound emerging from the field of action of said arc, or else by passing said compound through a tube chilled by a water jacket, but by the use of my improved apparatus and process, the necessity for the diluting air is obviated and the emerging gases are chilled in a much more efficient manner than is possible by the use of a water cooled tube.

The drawing shows a central vertical section of one form of apparatus for carrying out my improved process.

In the drawing:

1 is the casing of the reaction chamber 2. Said casing is preferably formed of insulating material and shaped as shown in the drawing approximately in the shape of an oblate spheroid provided on one side with the eduction tube 3.

Any approved form of apparatus for reducing the pressure in the chamber 2 is to be attached to the tube 3 and operated in any approved manner so as to vary said pressure to any desired extent.

The particular form of apparatus for reducing the pressure in the chamber 2 forms no part of my present invention.

The axis of the casing 2 is preferably vertical and there are formed at the bottom and top tapered electrode seats 4—4 which terminate in hollow cylindrical sleeves 5—5 which are threaded as at 6—6.

Cylindrical caps 7—7 provided with cylindrical threaded extensions 8—8 are screwed upon the threaded portions 6—6 of the sleeves 5—5, and main induction tubes 9—9 are connected to the extensions 8—8 by means of the couplings 10—10. Butterfly valves 11—11 are mounted in the induction tubes 9—9 in any approved manner and provided with handles 12—12 on the outside of said tubes by means of which the valves 11—11 may be set in any desired position.

The caps 7—7, tubes 9—9 and couplings 10—10 are preferably formed of metal.

Cylindrical electrodes 13—13 provided with tapered ends 14—14 are mounted upon the auxiliary induction tubes 15—15, bushings of asbestos 16—16 being interposed between said electrodes and said tubes. Metallic terminals 17—17 provided with tabs 18—18 are fitted snugly around the tapered ends 14—14 of the electrodes 13. Said electrodes are made to fit snugly within the tapered electrode seats 4—4 and conductors 19—19 are connected to the tabs 18—18 and pass through gas-tight bushings 20—20 which are fixed in the walls of the sleeves 5—5.

The electrodes 13—13 may be formed of any porous material in which the pores run substantially parallel to the axes of the tubes 15—15, and I have found that willow charcoal is especially suitable for this work when the gases employed do not readily combine therewith, care being taken that when the electrodes are formed the pores in said charcoal shall be parallel with the axes of said electrodes.

The tubes 15—15 are preferably formed of fused silica.

The diffuser 21 is provided with cylindrical ends 22—22 which fit snugly within the interior of the tubes 15—15 and with an enlarged cylindrical portion 23. The diffuser 21 is provided with the cylindrical hole 24 passing entirely through the center thereof.

The diffuser 21 is formed of porous material and is preferably formed of material in which the pores shall be transverse to the axis of said diffuser.

I preferably form the diffuser 21 by securing together in any approved manner a plurality of laminae of willowwood when the gases employed do not readily combine therewith, said laminae being mutually disposed so that the directions of the pores in said laminae shall be at equal angular distances apart.

After said laminae are secured together as just described, the hole 24 is to be bored, the ends thereof preferably rounded as shown at 25—25 and the ends 22 and enlarged portion 23 turned to size. The diffuser 21 is then to be carbonized and is ready for use.

It is evident that the tubes 15—15 may be slipped through the packing 16—16 so as to firmly clamp the diffuser 21 between the ends of said tubes.

The tubes 15—15 extend outwardly through the holes 26—26 provided in the caps 7—7.

The tubes 9—9 and 15—15 are to be connected to any sources of gas that it is desired to operate upon. It is evident that by using the main induction tubes 9 and the auxiliary induction tubes 15, I may introduce any gas through either pair of tubes or any combination of gases through either pair of tubes.

It is also to be noted that the streams of gas or gases which pass through the tubes 9—9 pass through the pores in the electrodes 13—13 in the direction of the axes of said electrodes, and that the streams of gas or gases which pass through the tubes 15—15 are ejected through the transverse pores of the diffuser 21, and thus surround said diffuser with a region of outwardly moving gas streams 26. The gas streams 26 striking the gas streams coming through the longitudinal pores of the electrodes 13—13 bend the latter gas streams approximately into the form shown at 27—27. The conductors 19—19 are to be connected to any suitable source of electricity and an arc takes place between the abutting faces of the electrodes 13—13.

The arc between said electrodes is caused to spread outwardly by the gas streams 26 so that said arc approximately follows the course of the gas streams 27—27.

It is evident that I may connect to the conductors 19—19 any suitable source of electricity, either direct or alternating current, of any potential and the latter current may be of any frequency, but I preferably use an alternating current of a suitable potential and a high frequency because of the greater stability of the arc and the equal and uniform high temperature of the electrodes obtained thereby.

I find that a vertical arc is more stable and effective than arcs in other directions.

I also find that the percentages of the gases that are combined increase with the temperature of the gases. I therefore prefer to have the gases at a high temperature during the instant when combination takes place and I then immediately reduce the temperature of the compound to prevent dissociation. I also find that the formation of gaseous ions in my peculiar form of arc greatly aids in producing the compound.

My improved process is carried out as follows:—

The apparatus for reducing the pressure in the chamber 2 being operated and the source of electricity connected to the conductors 19—19, the proper gases are permitted to flow through the tubes 9—9 and 15—15.

The gas streams passing through the tubes 9—9 will pass longitudinally through the pores in the electrodes 13—13 in the same direction as the electric current and will follow the paths shown as at 27—27 under the influence of the gas streams 26. The electric arc will also follow the path of the streams 27—27 and thus the gases in said streams are heated to a high temperature and subjected at the same time to electric ionization.

When the gas streams shown at 27—27 reach approximately the middle of the reaction chamber 2 they are subjected to the outwardly flowing streams 26 of cool gas or gases which come through the tubes 15—15 and are immediately chilled thereby below the point at which dissociation of the compound can take place.

It is to be noted that the tubes 9—9 are arranged to lie adjacent to the eduction tube 3 so that the heat of the gases passing through the latter serves to pre-heat the gas passing through the former.

It is also to be noted that the velocity of the gas streams passing through the tubes 9—9 may be regulated by turning the butterfly valves 11—11, and thus the quantity of gas passing through the electrodes 13—13 may be regulated to such an amount as can be readily chilled by the gas or gases passing through the diffuser 21.

It is also to be noted that the apparatus which is used for producing a suction in the eduction tube 3 serves to remove the compound as the same is formed and the ingress of gas through the main induction tubes 9 and the auxiliary tubes 15 serves to scavenge the reaction chamber.

I claim:—

1. The herein described process of fixing atmospheric nitrogen which consists in passing streams of gas or gases through porous electrodes simultaneously with the passage of an electric arc between said electrodes.

2. The herein described process of fixing atmospheric nitrogen which consists in passing streams of preheated gas or gases through porous electrodes simultaneously with the passage of an electric arc between said electrodes and simultaneously passing a stream of cool gas across said first named streams of gas or gases and across said arc.

3. The herein described process of fixing gases which consists in passing streams of gas or gases through porous electrodes simultaneously with the passage of an electric arc between said electrodes.

In testimony whereof I affix my signature.

GEO. T. SOUTHGATE.